July 28, 1959   W. R. BUECHLER   2,896,436
CLOTHES WASHER WITH AN IMPROVED ADJUSTABLE
WATER LEVEL CONTROL SYSTEM
Filed June 25, 1958   4 Sheets-Sheet 2

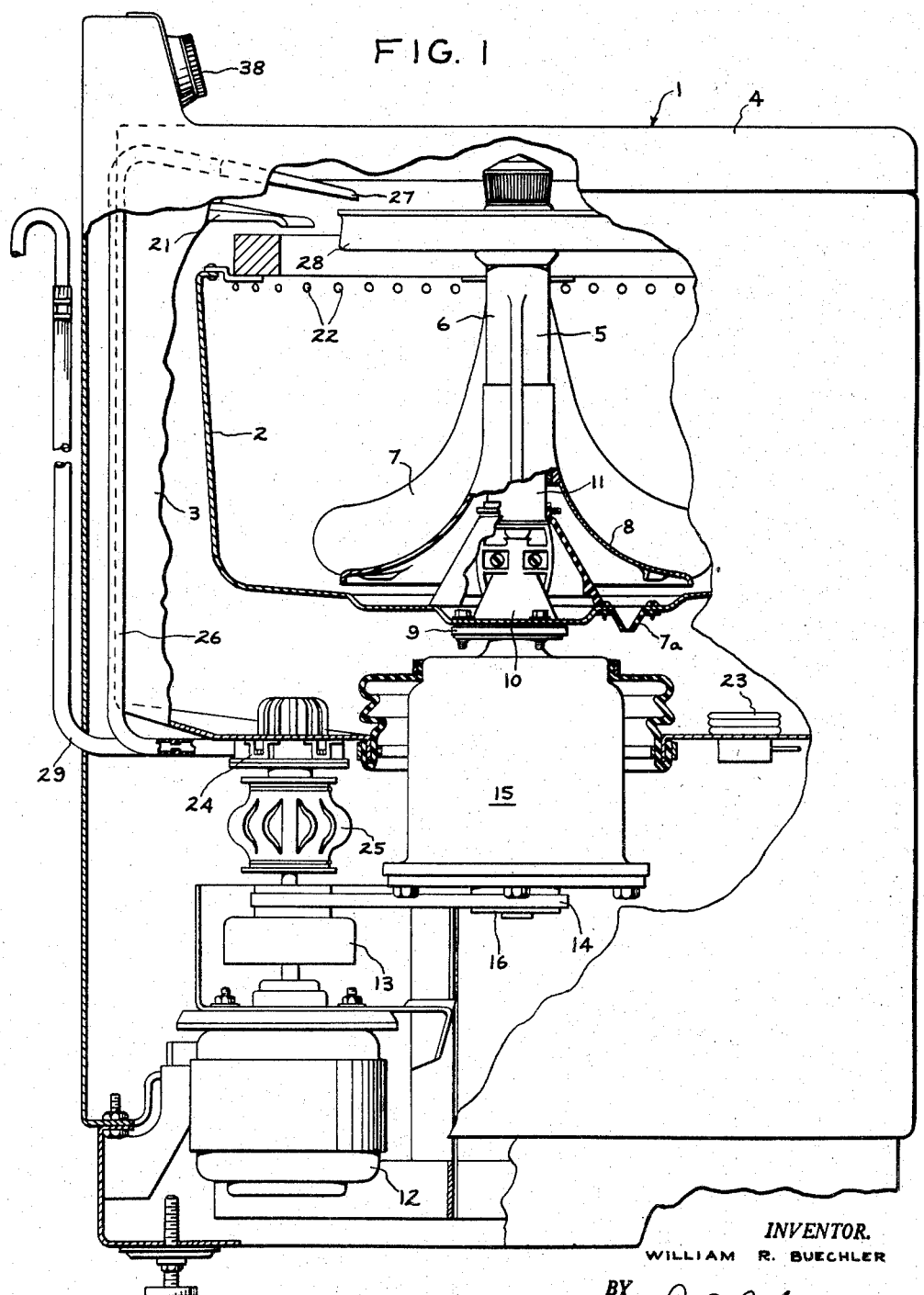

INVENTOR.
WILLIAM R. BUECHLER
BY
HIS ATTORNEY

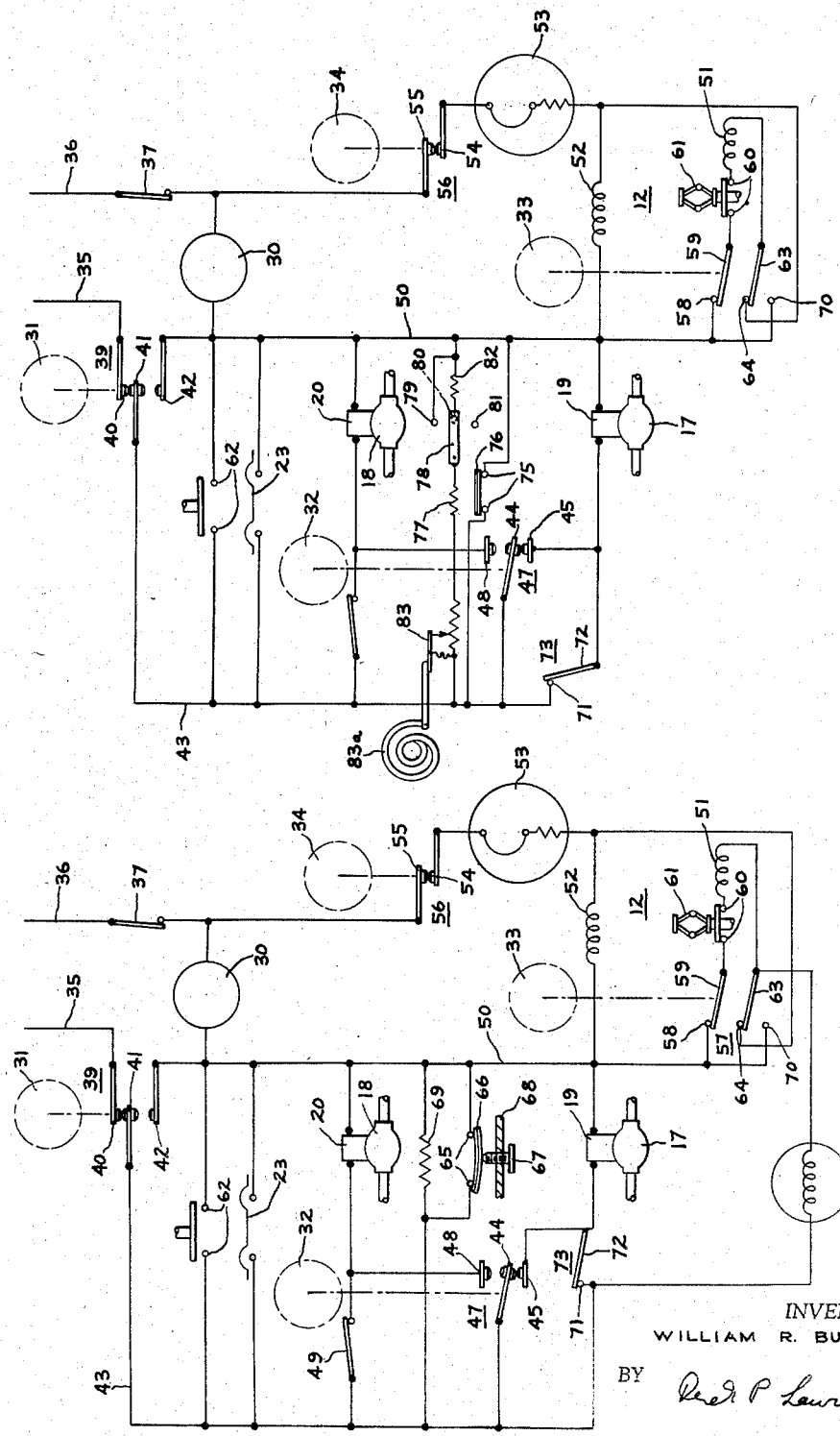

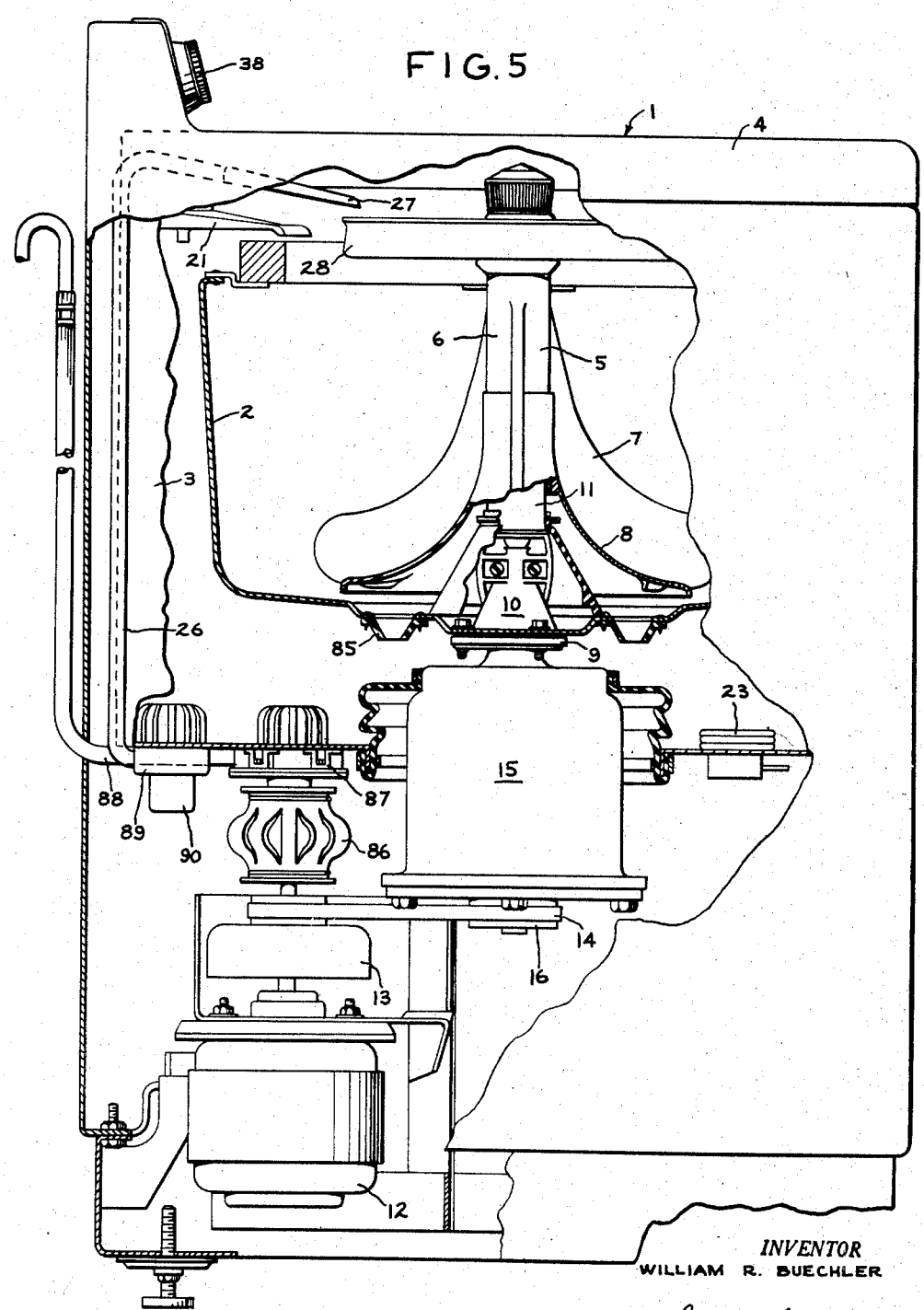

United States Patent Office 2,896,436
Patented July 28, 1959

2,896,436

CLOTHES WASHER WITH AN IMPROVED ADJUSTABLE WATER LEVEL CONTROL SYSTEM

William R. Buechler, Clinton, Iowa, assignor to General Electric Company, a corporation of New York Application June 25, 1958, Serial No. 744,439

10 Claims. (Cl. 68—12)

This invention relates to clothes washing machines of the type wherein the clothes are washed in a basket, and more particularly to an improved arrangement for providing an adjustable liquid level within the basket so that the operator may use less liquid where a smaller quantity is adequate as, for instance, in the case where only a small load of clothes is to be washed.

It is an object of this invention to provide an arrangement whereby the operator of the washer is enabled to preset the quantity of water which will flow into the washer.

It is a further object to provide an arrangement whereby the operator of the machine can with a single setting select both the amount of wash water and the amount of rinse water, that is, whereby the same setting which provides a limited amount of wash water will also provide the same limited amount of rinse water.

Yet another object of this invention is to provide an improved adjustable water level selector which provides for a controlled amount of water to the basket independently of the other functions of the machine such as spin time and speed, agitation time and speed, etc.

A further object of the invention is to provide means which are automatically effective in response to energization of the solenoids provided to control the inlet water valves, so that the control is provided automatically as an inherent result of introducing water to the basket.

Clothes washing machines of the type mentioned above generally include an outer tub, with the basket rotatably mounted within. It has frequently been found desirable to include a recirculation system by means of which water overflows from the basket to the tub when it reaches a maximum level in the basket, and is then returned to the basket. Such recirculation systems make possible, for instance, continuous cleaning and filtering of the washing liquid during the washing and rinsing operations by including appropriate filter means in the system. However, recirculation hitherto has taken place in such systems only when the clothes basket has had a full complement of water since otherwise the water did not reach the overflow means and did not flow into the tub to be returned through the recirculation system, thus eliminating the filtering action unless the basket was substantially full. It is accordingly a further object of this invention to provide an adjustable water level control system with recirculation of the liquid at all levels within the basket.

In carrying out my invention, in one aspect thereof, I provide a clothes washing machine which includes the usual clothes and liquid receptacle or basket. Valve means are provided for controlling the supply of liquid to the receptacle, and suitable electromagnet means control the valve means in the usual manner, permitting flow when energized and preventing flow when de-energized. To control the energization of the electromagnet means, I provide an arrangement which includes normally open contacts arranged in parallel with the electromagnet means, and low resistance thermally responsive means positioned to close the contacts upon sensing a predetermined amount of heat. Closing of the contacts in effect provides a short circuit across the electromagnet means so as to de-energize them. Means for heating the thermally responsive means are positioned adjacent thereto and arranged to operate concurrently with energization of the electromagnet means. I also include means for varying the rate at which the heating means closes the thermally responsive means across the contacts, and thereby I provide varying liquid levels in the receptacle by adjusting the time lapse before de-energization of the electromagnet means closes the valve means.

The heating means are electric, and are included in parallel with the contacts in the same circuit as the solenoid which control the inlet valves so that heat is supplied to the thermally responsive means as soon as the solenoids are energized. Thus, the timing function is started automatically at the instant the water starts to enter the basket.

The subject matter which I regard as my invention is particularly pointed out and distinctly claimed in the concluding portion of this specification. My invention, however, both as to organization and method of operation, together with further objects and advantages thereof, may best be understood by reference to the following description taken in conjunction with the accompanying drawings in which:

Fig. 1 is a side elevational view of a clothes washing machine typical of those in which the improved water level control may be provided;

Fig. 4 is a schematic diagram of an electrical control circuit including a modification of my improved liquid level control arrangement;

Fig. 5 is a side elevational view of a clothes washing machine modified in accordance with a third embodiment of my invention; and Fig. 6 is a schematic diagram of the electrical control circuit of the washer of Fig. 5 further illustrating the third embodiment of my improved liquid level control system.

Figure 3:
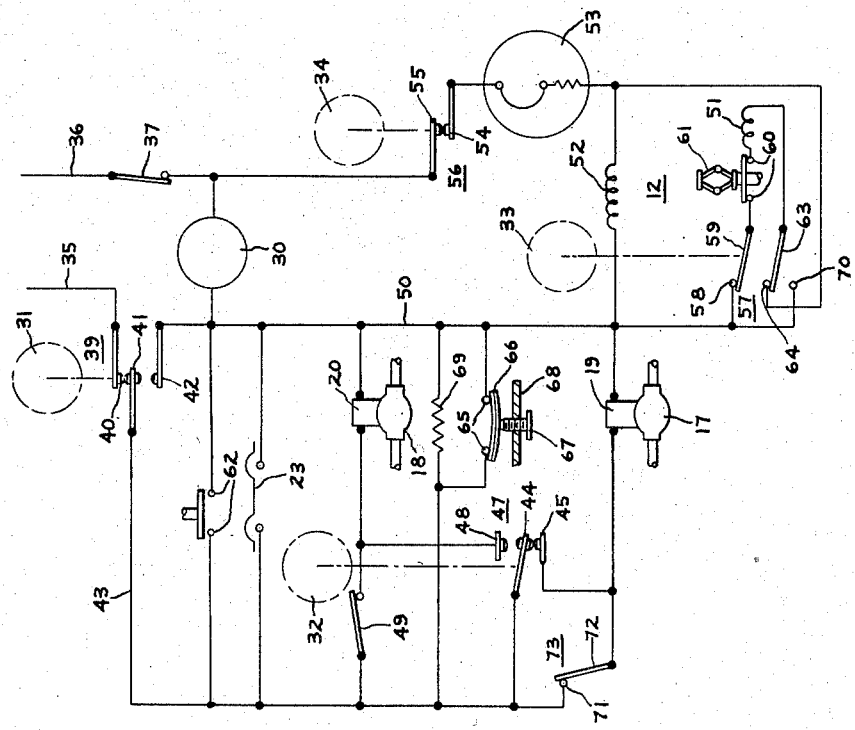
Fig. 3 is a schematic diagram of an electrical control circuit including the improved liquid level control arrangement of my invention, as applied to the washing machine of Figs. 1 and 2.

Referring now to Fig. 1, I have shown therein an agitator-type clothes washing machine 1 having a clothes basket 2 in turn disposed within an outer tub or casing 3. Tub 3 is mounted within an appearance cabinet 4 which includes a hinged cover 4a (Fig. 2) for providing access to the clothes basket. At the center of basket 2 there is positioned a vertical axis agitator 5 which includes a center post 6 and a plurality of radially extending vanes 7. The agitator is further provided with an outwardly and downwardly flared skirt 8 to which vanes 7 are joined at their lower ends. A small aperture 7a is provided at the bottom of basket 2 in the usual manner to permit a small flow of liquid from the basket into the tub to remove sand and other heavy soil particles from the basket. Both the clothes basket 2 and the agitator 5 are rotatably mounted. The basket is mounted on a flange 9 of a rotatable hub 10, and the agitator 5 is mounted on a shaft (not shown) which extends upwardly through portion 11 of the hub 10 and the center post 6. The agitator is secured to the shaft by any suitable means (not shown). During the cycle of operation of the machine 1 the agitator is first oscillated back and forth within basket 2 to wash the clothes therein. Then, after a predetermined period of this washing action, the basket is rotated at high speed to extract centrifugally the washing liquid and discharge it into the outer tub 3. Following this extraction operation a supply of clean liquid is introduced into the wash basket for rinsing the clothes and the agitator is again oscillated. Finally, the basket is once more rotated at high speed to extract the rinse water and discharge it into the outer tub.

The basket 2 and agitator 5 may be driven by any suitable means. By way of example I have shown them as driven from a reversible motor 12 which drives the basket and the agitator through a drive including clutch 13 mounted on the motor shaft. Clutch 13 allows the motor to start without load and then picks up the load as it comes up to speed. A suitable belt 14 transmits power to transmission assembly 15 through pulley 16; thus, depending upon the direction of motor rotation, pulley 16 of transmission 15 is driven in one direction or the other.

The transmission 15 is so arranged that it supports and drives both the agitator drive shaft and the basket mounting hub 10. When motor 12 is rotated in one direction the transmission causes agitator 5 to oscillate within basket 2. Conversely, when the motor 12 is driven in the opposite direction, the transmission drives the wash basket 2 and the agitator 5 together at high speed for centrifugal extraction. While the drive mechanism forms no part of the invention, reference is made to the copending application of James R. Hubbard et al., Serial No. 420,594, filed April 2, 1954, (now patent 2,844,225, issued July 22, 1958), owned by the General Electric Company, assignee of the present application. That application discloses in detail the structural characteristics of a transmission assembly suitable for use in the illustrated machine.

Figure 2:
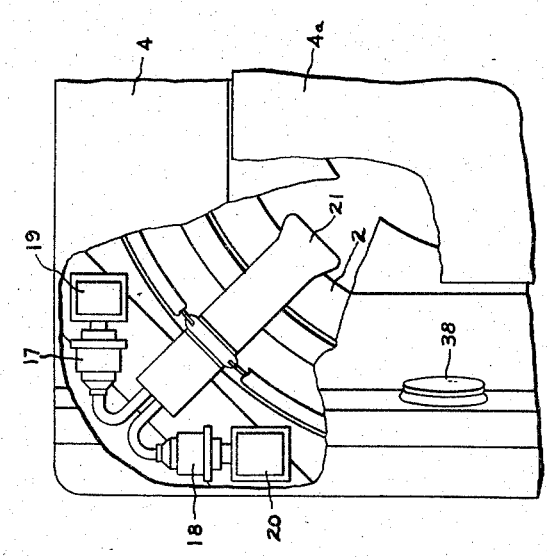
Fig. 2 is a fragmentary plan view of the washer of Fig. 1, showing a typical arrangement of the electrically energized hot and cold water supply valves.

In order to introduce washing and rinsing liquid into basket 2, water is supplied from a suitable external source to the basket. Referring now particularly to Fig. 2, the washing machine is provided with conventional solenoid operated valves 17 and 18 having solenoids 19 and 20 and intended respectively for connection to hot water and cold water sources and feeding into a common spout 21 which reaches over the top of the basket to discharge thereinto. The valves are opened when their respective solenoids are energized and closed when their solenoids are de-energized. In operation, the liquid is introduced into basket 2 through conduit 21 until it overflows through apertures 22 provided at the upper edge of the basket side wall to form a pool of water in the bottom of tub 3 which increases in depth until a water level responsive switch such as pressure switch 23 is actuated. As will be further explained, this causes the valves 17 and 18 to be closed, and motor 12 to start operating in the direction suitable to cause agitator 5 to oscillate and basket 2 to remain stationary. When motor 12 starts to operate, it also drives a pump 24 through a flexible coupling 25 which connects the motor shaft and the pump shaft. During washing and rinsing operations, pump 24 discharges into a conduit 26 which leads to a nozzle 27 positioned above a filter 28 so that the liquid is recirculated in order to clean and filter water during the washing operation. The system constantly circulates the washing liquid from the tub 3 through nozzle 27 and filter 28 back into basket 2. At the end of the washing and rinsing portions of the cycle and in response to a reverse direction of rotation of motor 12, as will be described, pump 24 discharges into a drain conduit 29 which is adapted for discharge to a stationary tub or drain line so that the pump is effective to drain tube 3. While any suitable pump may be used for draining purposes, the one just now described is representative and is described in detail and claimed in copending application Serial Number 468,460, filed November 12, 1954, by John Bochan and owned by the General Electric Company, assignee of this application.

Referring now to Fig. 3, there is shown an electrical control system for the machine 1. It will be understood that present-day washers include various controls which do not relate in any way to the present invention, and that, to some extent, these have been omitted for the sake of simplicity and ease of understanding of the invention.

In order to control the sequence of operation of washing machine 1, the circuit includes a timer motor 30 which drives a plurality of cams 31, 32, 33 and 34. These cams during their rotation by the timer motor actuate various switches so as to cause the machine to pass through the above mentioned cycle of operation, first introducing wash water, then washing the clothes, next extracting the wash water from them, then introducing clean water to rinse the clothes, and finally extracting the rinse water from the clothes. The electrical circuit as a whole is energized from a two wire power supply 35—36. To initiate a washing cycle, switch 37 is closed. This may be effected in the usual manner, for instance, by means of a suitable control knob 38 (Figs. 1 and 2). With switch 39 in the position shown in Fig. 3, a circuit is then completed to contacts 40 and 41 of switch 39 controlled by cam 31. It is to be noted that switch 39 further includes another contact 42, and that cam 31 can maintain these contacts in three different conditions, that is, with no contact at all between them, with contacts 40 and 41 engaged, and with all three contacts 40, 41 and 42 engaged.

From contact 41 the circuit extends through a conductor 43 to the control solenoid 19 of hot water valve 17. This is effected through contacts 44 and 45 of a switch 47 controlled by cam 32 which closes contacts 44 and 45 for the washing operation. For the rinsing operation, cam 32 moves contact 44 against contact 48. If it is desired to supply warm water to basket 2 for the wash rather than hot water, then a manually actuated switch 49 is also closed. This closes a circuit energizing the control solenoid 20 of cold water valve 18 so that both hot and cold water are supplied through conduit 21 to basket 2.

The valve energizing circuit continues through a conductor 50, the timer motor 30 and switch 37 back to line 36. From conductor 50 a circuit also extends through an alternate path which includes both the start winding 51 and the main winding 52 of motor 12. More specifically, the circuit extends from main winding 52 through a protective device 53 and the contacts 54 and 55 of a switch 56 controlled by cam 34. As shown contacts 54 and 55 are closed when the timer is in the wash portion of the cycle. The start winding 51 is connected in the circuit in parallel with main winding 52 by means of a double pole double throw motor reversing switch 57 which is controlled by cam 33. From conductor 50, the circuit extends through start winding 51 to contacts 58 and 59 of switch 57 and through the contacts 60 of a motor operated centrifugal switch 61 which is closed when the motor is at rest or rotating below a predetermined speed. Centrifugal switch 61 also controls the closing of a pair of contacts 62, closing them to connect conductors 43 and 50 when the motor rotating above the predetermined speed as will be further described hereinbelow. The start winding circuit is completed on its other side through contacts 63 and 64 of switch 57.

With the timer motor 30 and the start and main windings 51 and 52 of drive motor 12 connected in parallel, a much lower impedance is presented in the circuit by the motors than is presented by the valve solenoids 19 and 20 which are in series therewith. As a result, the greater portion of the supply voltage is taken up across the solenoids 19 and 20 and relatively little across the motors, and this causes the solenoids to be energized sufficiently to open the water valves to admit hot and cold water mixed with each other (assuming switch 49 to be closed) to the machine through conduit 21, with the timer and drive motors remaining inactive. Connected in parallel with solenoids 19 and 20 across conductors 43 and 50 there are provided a pair of contacts 65, and suitable thermally responsive means for causing connection of the contacts such as a low-resistance bridging bimetallic element 66 which may be of the usual commercially available type. The bimetallic element, for a reason that will appear more clearly below, is mounted on a threaded member 67 which may be screwed in and out of a stationary part 68 so as to move the bimetallic element 66. In parallel with the bimetallic element 66 and in physical proximity thereto I provide a small resistance heating element 69 to effect heating of the bimetallic element. The adjustability of the position of element 66 causes the element 69 to be of differing effectiveness in causing bridging of contacts 65, thus providing a control over the time required for the bridging to take place.

With this arrangement, closing of contacts 40 and 41 by cam 31 causes energization of the solenoids 19 and 20 to introduce water to conduit 21. At the same time, a circuit is established through resistance heater 69 to start heating of bimetallic element 66. Depending upon the setting established by the threaded member 67, a certain amount of time will elapse before the bimetallic element 66 is heated enough to deform and bridge contacts 65. At the time this occurs, it has the effect of substantially shorting conductors 43 and 50 together to remove substantially all power from across the solenoids 19 and 20 and connect timer motor 30 and drive motor 12 directly between conductors 35 and 36; both motors then start in operation. As can be seen, the operation of heater element 69 is automatically dependent upon energization of valve solenoids 19 and 20 and starts at the same time, so that for any given setting an accurate amount of time may be predicted before the heating effect is sufficient to cause bimetallic element 66 to bridge across contacts 65. The combination of heater 69 and adjustable bimetallic element 66 thus provides a method of determining the amount of time that solenoids 19 and 20 will be operative, and as a direct result thereof determines the amount of water which is to be introduced to basket 2 for any given washing operation. The pressure sensitive switch 23 is connected in parallel with solenoids 19 and 20 between conductors 43 and 50, and may be used as a maximum fill control device, or if all normal filling operations are to be controlled through the bimetallic element arrangement, it may be omitted or else used simply as a safety device.

As the motor 12 comes up to speed, the centrifugal switch 61 opens to remove the start winding 51 from the circuit by opening contacts 60; also, when back contacts 62 are provided on the centrifugal mechanism, they close as the motor comes up to speed to insure a shorting across conductors 43 and 50 regardless of subsequent changes in the position of either bimetallic element 66 as it cools or pressure switch 23. With the position of the reversing switch 57 shown in Fig. 3, the polarity of the start winding is such that motor 12 rotates in the direction for causing operation of agitator 5.

The washing operation continues until cam 34 opens contacts 54 and 55 of switch 56, removing power from the drive motor 12 and halting operation of agitator 5. However, power is not removed from timer motor 30 since the circuit is still completed through it from conductor 43 through solenoids 19 and 20. The impedance of timer motor 30 is much greater than that of the valve solenoids so that it takes up most of the supply of voltage and continues in operation, the solenoids having so little voltage across them that they are ineffective to operate their respective valves.

As the timer continues to run, cam 33 reverses switch contacts 59 and 63 from their illustrated positions so that contact 59 engages contact 64 and contact 63 engages a contact 70. This reverses the polarity of start winding 51. Timer 30 continues to run, causing cam 31 to close all three contacts 40, 41 and 42 of switch 39 together giving a direct connection from line 35 to the motors 30 and 12 and shorting across water valves 19 and 20 regardless of switch 23 or bimetal 66. Timer 30 also causes cam 34 to close contacts 54 and 55 of switch 56. This places power on windings 51 and 52 of motor 12, and with the reversed polarity of the start winding the motor begins to rotate in the reverse direction from that in which it rotated during the washing period. As explained, this has the effect of driving basket 2 at high speed for extracting wash water from the clothes.

During the washing operation, pump 24 was discharging into conduit 26. It will of course be apparent that recirculation to any substantial extent through conduit 26 is obtained only when the water level is high enough to overflow through apertures 22, and this aspect of the invention will be further discussed in connection with the third embodiment explained in Figs. 5 and 6. However, to describe the action briefly, if the water level is high enough to overflow through apertures 22, the water spills out of the basket into tub 3 and is passed by pump 24 up through conduit 26 and out from nozzle 27 through filter 28 back into the basket 2.

During the reverse rotation of motor 12, as described above, the pump, instead of discharging into conduit 26, discharges into drain line 29 the water which is being spun out of basket 2 into tub 3.

The extraction period continues until cam 34 again opens contacts 54 and 55 of switch 56 to remove power from drive motor 12. As the wash basket 2 coasts to a stop, cam 31 returns to the position shown in Fig. 5 with contacts 40 and 41 in engagement, and cam 32 causes contact 44 to engage contact 48 of switch 47. With this action, cold water solenoid 20 is energized independently of manual switch 49. Timer motor 30 is now operating through contacts 44 and 48 of switch 47 and solenoid 20 of cold water valve 18, as well as through the resistance heater 69 once again. Also, if the operator wishes to have a warm water rinse, contacts 71 and 72 of manually operable switch 73 can be closed to put solenoids 19 and 20 in parallel again.

As mentioned above, the impedance of timer motor 30 is so much greater than that of the solenoids that the timer motor continues to run after the drive motor is disconnected and the solenoids are not energized sufficiently to open their valves. In addition to the switching operations performed by cams 31 and 32, cam 33 operates motor reversing switch 57 during this period to bring contact arms 59 and 63 into contact with contacts 58 and 64 respectively. The coast period continues until such time as cam 34 recloses contacts 54 and 55 of switch 56 to connect the main and start windings of the drive motor in parallel with the timer motor 30. This presents a relatively low impedance between conductors 50 and 36, and as a result the greater portion of the voltage drop now appears across heater 69 and solenoid 20 (and, if a warm rinse has been selected, solenoid 19). The timer motor stops running and solenoids 19 and 20 are operative to open their respective valves to introduce either cold or warm rinse water into wash basket 2. As during the introduction of water for fill, the resistance heater 69 is energized simultaneously with the solenoids to cause heating of bimetallic element 66, so that in the same manner as before the duration of introduction of water to basket 2 is controlled by the amount of time it takes for the bimetallic element 66 to be heated sufficiently to bridge contacts 65; at this time, the solenoids are shorted out, and line voltage is applied to the drive motor and the timer motor. The reapplication of line voltage to the drive motor and the timer motor starts both motors, with the drive motor driving the agitator 5 with an oscillatory motion as for the washing portion of the cycle. The rinse action continues until cam 34 again opens contacts 54 and 55 of switch 56 to remove power from the drive motor. The timer motor, however, continues to run and during the pause the cam 33 again reverses the position of the switch arms 59 and 63 to reverse the polarity of start winding 51 when it is reconnected. Also, cam 31 again reconnects all three contacts 40, 41 and 42 of switch 39. Cam 34 then closes contacts 55 and 54 of switch 56 to cause motor 12 to start and provide a spin or extraction action to centrifuge the rinse water out through conduit 29 by means of pump 24.

It will be seen from the foregoing that, by provision of the bimetal and heater arrangement in parallel with valve solenoids 19 and 20, an inexpensive, effective, and automatically operative adjustable timer has been provided to give any desired liquid level for both washing and rinsing by a single setting of the adjustable member.

Referring now to Fig. 4, there is shown a second embodiment of my invention as applied to a washing machine of the type illustrated and described in connection with Figs. 1 and 2. In all respects, except for the adjustable control for timing the "fill" parts of the cycle, the circuit is the same as that described in Fig. 3 in connection with the first embodiment of the invention. Accordingly, like numerals are used for like parts, and the functioning of the various parts is precisely the same as that described for the embodiment illustrated in Fig. 3 with the exception described below in connection with the variable level control.

A pair of contacts 75 are connected across conductors 43 and 50 and are adapted to be bridged by a bimetallic element 76, which in this case is not intended to be movably adjustable. It will thus be seen that, as before, when bimetallic element 76 bridges contacts 75, solenoids 19 and 20 are shorted out to stop the inflow of water. In order to cause heating of the element 76 to start concurrently with energization of the solenoids 19 and 20 a resistance heater 77 is provided in parallel with contacts 75 adjacent element 76. Heater 77 is connected in series with a switch member 78 which can be connected to any one of three contacts 79, 80 or 81. When switch arm 78 is connected to contact 81, it is entirely disconnected from any electrical energization and therefore there is no heating to cause any change in shape of element 76. Accordingly, the filling of basket 2 is entirely dependent on pressure switch 23 and the basket will fill to its full level.

However, if switch arm 78 is conected to contact 80, then resistance heater 77 is energized through a resistor 82 and will be operative to heat the element 76 at a rate which is determined by the amount of resistance in the circuit, thus providing a predetermined level within the basket not dependent on pressure switch 23. Of course, the rate of heating of element 76 is selected so that a smaller amount of liquid is introduced into the basket than is the case where pressure switch 23 is the controlling element.

If a relatively small amount of water is desired in the basket, contact arm 78 is placed in engagement with contact 79 to complete a circuit through resistance heater 77 while by-passing resistor 82. This decrease in the total resistance in the circuit causes more rapid heating of element 76 so that the valve solenoids 19 and 20 are shorted out earlier than would be the case if resistance 82 were in the circuit. Thus, the arrangement shown in Fig. 4 provides three distinct levels in the basket to which the water level can be adjusted, both for wash and rinse operations. It will of course be apparent that the number of positions of arm 78 is not restricted to three, and that many other selections are possible; in fact, instead of the construction shown, arm 78 could be a movable contact along a rheostat which would provide an infinite variety of levels. The essence of the embodiments of Fig. 4 is the illustration of an electrical adjustment for the heating effect on the element 76 rather than the mechanical adjustment of the first embodiment.

In addition, in the embodiment of Fig. 4, there is shown variable resistor 83 which is in series with resistance heater 77 and in parallel with the shorting out arrangement contacts 75 and element 76. Resistor 83 may be provided, if so desired, so as to cause a resistance proportional to the inlet pressure to be provided thereby to provide a resistance generally proportional to the rate of fill and account for variations in the supply pressure. When the supply pressure varies during a fill period, the corresponding proportional change of the resistance will vary the rate of heat flow to the bimetal so as to insure that the predetermined amount of liquid enters the machine before the bimetal shorts out the solenoids. The control of the resistance of the resistor 83 by pressure variations may be accomplished by any one of many standard arrangements. One of several obvious and well known expedients would be to utilize, as shown, a Bourdon tube pressure gage 83a to sense the pressure and move a slide wire across resistor 83 to vary the effective resistance thereof, increasing the resistance with decreases in pressure and vice versa. As explained before, the total resistance in the circuit of heater 77 determines the heating effect thereof; thus, variations in the effective resistance of resistor 83 could be made responsive to variations in the pressure to avoid substantial differences in the levels provided by the heater and bimetal arrangement which might otherwise result from variations in the supply pressure of the liquid entering valves 17 and 18.

Referring now to Figs. 5 and 6 of the drawings, a third embodiment of the invention will be described, using like numerals for like parts. Referring first primarily to Fig. 5, the first major deviation in the construction from that described and illustrated in connection with Fig. 1 is in the provision of a number of relatively substantial apertures 85 in the bottom of basket 2 instead of the apertures 22 provided in the embodiment of Fig. 1 adjacent the top of the basket. Also, the drive motor 12 is connected through a flexible coupling 86 to a pump 87 which is connected only to the drain hose 88 and is effective only for one direction of operation so that it pumps water out through hose 88 only when the motor 12 is rotating in the direction to effect centrifugal extraction of the liquid by spinning basket 2. Recirculation of liquid from the tub back into the basket through conduit 26 is effected by means of an entirely separate pump 89 powered by an entirely separate motor 90 which is effective, as will be explained, during both the filling and agitation parts of the cycle to pump liquid back from the tub 3 into the basket 2. The capacity of pump 89 is greater than the capacity of apertures 85 so that during its operation the pump 89 is effective to maintain almost all of the liquid within the basket 2.

Referring now also to Fig. 6, the electrical circuitry provided in connection with the washing machine of Fig. 5 will be described; this circuitry is precisely the same in all respects as that of the embodiment of Fig. 3 except as set forth below, and thus operation of like parts, which are provided with like numerals, will not be described again so as to avoid undue repetition.

Pump motor 90 is connected between conductor 43 and contact 63 of switch 57. With this connection, when switch arm 63 engages contact 64 and the cams 31 and 34 are in the position effective to provide fill and agitation, the energizing circuit of motor 90 is completed at one side through contacts 41 and 40 to line 35 and on the other side thereof through contacts 54 and 55 to line 36. Thus, it can be seen that motor 90 is in parallel with all of the other operating components of the system, namely, the solenoids 19 and 20 and the other two motors 12 and 30. With this connection, when contacts 40 and 41 are together and contacts 54 and 55 are together for fill and agitation, motor 90 operates and causes recirculation of all the liquid which flows through apertures 85 into tub 3. As described in connection with the other embodiments, the bimetal element 66 and heater 69 provide a variable level fill so that flow stops at the desired time to provide the intended liquid level within basket 2. However, the operation of motor 90 continues unaffected: it is dependent only on the position of switch arm 63 and contacts 40 and 41, and 54 and 55, which are not affected at the time that the fill stops and the agitation begins. Circulation in full of the water flowing through apertures 85 thus continues during agitation and until such time as arm 63 is moved against contact 70 by cam 33 and contacts 40, 41 and 42 are all moved together by cam 31, as described in connection with the circuit illustrated in Fig. 3. At this time a spin operation is provided, and with the motor 12 operating in the reverse direction the pump 87 which is operated by the motor is then effective to move the liquid through the drain hose 88. The sequence is repeated, as described in connection with Fig. 3, for the rinse part of the cycle, with fill and agitation occurring with full recirculation throughout both of these phases of the operation and then being followed by a final spin. It will be observed that motor 90 does not operate during spin because the closing of contacts 41 and 42 effectively shorts it out of the circuit when cam 33 reverses the position of arm 63 of switch 57 to engage contact 70.

The main advantage represented by the embodiment of Figs. 5 and 6 is that the provision of the apertures 85 in the bottom of basket 2, together with means for providing recirculation during both fill and agitation, and together with the variable level providing means, permits the operator to obtain complete recirculation regardless of the level within the basket she has selected. The advantage of the other embodiments of the invention, the pre-setting of the control apparatus to give the desired level within basket 2 with one setting, made before the operation, which controls both wash and rinse, is, of course, also provided in this embodiment.

While in accordance with the patent statutes, I have described what at present are considered to be the preferred embodiments of my invention, it will be obvious to those skilled in the art that various changes and modifications may be made without departing from the invention, and I therefore aim in the appended claims to cover all such equivalent variations as fall within the true spirit and scope of the invention.

What I claim as new and desire to secure by Letters Patent of the United States is:

1. In a washing machine having an article and liquid receptacle: valve means for controlling the supply of liquid to said receptacle; electromagnet means for controlling said valve means, said electromagnet means opening said valve means when energized and closing said valve means when de-energized; an electrical circuit for said electromagnet means and means for controlling energization of said electromagnet means comprising normally open contacts arranged in said circuit in parallel with said electromagnet means, closing of said contacts causing de-energization of said electromagnet means by reason of the drop in the voltage across said electromagnet means, thermally responsive means arranged to close said contacts as the temperature of said thermally responsive means rises, means for heating said thermally responsive means during energization of said electromagnet means, said heating means being arranged in said circuit in parallel with said contacts, and means for varying the time required for said heating means to cause said thermally responsive means to close said contacts whereby varying liquid levels are provided in said receptacle.

2. In a washing machine, a rotatable clothes basket having a side wall and a bottom; means for washing clothes in said basket; an outer imperforate tub enclosing said basket side wall and bottom; a water inlet conduit extending to said basket; valve means for controlling the supply of liquid through said conduit to said basket; electromagnet means controlling said valve means, said electromagnet means when energized opening said valve means and when de-energized closing said valve means; adjustable timer means controlling the duration of energization of said electromagnet means during filling of said basket to permit any desired level of water in said basket for washing; means forming substantial apertures in said basket bottom communicating with said tub; means including a pump for circulating liquid from said tub back into said basket, said pump having a greater capacity than said apertures whereby almost all of the liquid is retained in said basket; and second timer means for providing a wash period of predetermined length subsequent to the filling operation, said pump being connected to operate during both filling and wash.

3. In a washing machine having an article and liquid receptacle: valve means for controlling the supply of liquid to said receptacle; at least one solenoid for controlling said valve means, said solenoid providing for flow of liquid through said valve means when energized and preventing flow of liquid through said valve means when deenergized; and means for controlling energization of said solenoid comprising normally open contacts arranged in parallel with said solenoid, closing of said contacts causing de-energization of said solenoid because of the drop in the voltage across said solenoid, a low resistance bimetallic element arranged in bridging relationship to said contacts, said bimetallic element being arranged to deform to bridge said contacts when its temperature rises to a predetermined level, an electric heating element energizable concurrently with said solenoid for heating said bimetallic element, said heating element being in parallel with said contacts, and means for adjustably moving said bimetallic element relative to said heating element thereby to vary the time required for it to reach said predetermined temperature required for closing of said contacts, whereby varying liquid levels can be provided in said receptacle by varying the position of said bimetallic element prior to energization of said solenoid.

4. In a washing machine having an article and liquid receptacle: valve means for controlling the supply of liquid to said receptacle; at least one solenoid for controlling said valve means, said valve means being arranged to pass liquid when said solenoid is energized and to prevent passage of liquid when said solenoid is de-energized; and means for controlling energization of said solenoid comprising normally open contacts arranged in parallel with said solenoid, closing of said contacts causing de-energization of said solenoid because of the drop in the voltage across said solenoid, a bimetallic element arranged to bridge said contacts when its temperature rises to a predetermined level, an electric heating element positioned adjacent said bimetallic element for heating said bimetallic element, said heating element being connected in parallel with said solenoid and with said contacts, and means for varying the time required for the closing of said bimetallic element across said contacts comprising a resistor, and means cooperable with said resistor for varying the amount of resistance in series with said heating element, whereby said heating element has varying heating effects on said bimetallic element whereby the time of energization of said solenoid can be varied to control the liquid level provided through said valve means in said receptacle.

5. In a washing machine having an article and liquid receptacle: valve means for controlling the supply of liquid to said receptacle; at least one solenoid for controlling said valve means, said solenoid when energized permitting flow of liquid through said valve means and when de-energized preventing flow of liquid through said valve means; and means for controlling energization of said solenoid comprising normally open contacts arranged in parallel with said solenoid, closing of said contacts causing de-energization of said solenoid by virtue of the drop in the voltage across said solenoid, a low resistance bimetallic element arranged in bridging relationship with said contacts, said bimetallic element being arranged to bridge said contacts when its temperature reaches a predetermined level, a heating element positioned adjacent said bimetallic element and connected in parallel with said contacts, said heating element being energized and de-energized concurrently with said solenoid, and means for varying the time required for said heating element to cause said bimetallic element to bridge said contacts thereby to vary the liquid level which is provided through said valve means in said receptacle.

6. In a washing machine having an article and liquid receptacle: valve means for controlling the supply of liquid to said receptacle; electromagnet means for controlling said valve means, said electromagnet means when energized permitting flow through said valve means and when de-energized preventing flow through said valve means; and means for controlling energization of said electromagnet means comprising normally open contacts arranged in parallel with said electromagnet means, closing of said contacts causing de-energization of said electromagnet means by virtue of the drop in voltage acrosss said electromagnet means, a low resistance bimetallic element arranged to bridge said contacts when it reaches a predetermined temperature, a heating element adjacent said bimetallic element, said heating element being connected in parallel with said contacts and in parallel with said electromagnet means, adjustable means for varying the time required for said heating element to cause said bimetallic element to bridge said contacts thereby to provide varying liquid levels in said receptacle through said valve means, a variable resistance connected in series with said heating element and in parallel with said contacts and said electromagnet means, and means responsive to the pressure of the liquid supply to control said variable resistance to provide an increased resistance with decreases in the pressure of the liquid flowing through said valve means and decreased resistance with increases in pressure of the liquid flowing through said valve means thereby to vary the heating effect of said heating element with the pressure in said valve means so as to provide a substantially constant response for any one position of said adjustable means.

7. In a clothes washing machine, a rotatable clothes basket; means for washing clothes in said basket; electric drive means for said clothes washing means; a water inlet conduit extending to said basket; valve means for controlling the supply of liquid to said conduit; electromagnet means controlling said valve means and arranged in series with said drive means; said electromagnet means providing for flow through said valve means when energized and preventing flow through said valve means when de-energized, the relative impedances of said electromagnet means and said drive means being such that when they are connected in series said electromagnet means is energized and said drive means is not energized, normally open contacts arranged in parallel with said electromagnet means and in series with said drive means, thermally responsive means arranged to close said contacts when said thermally responsive means sense a predetermined amount of heat whereupon said electromagnet means is de-energized by virtue of the drop in voltage thereacross and said drive means is energized, electric heating means in series with said drive means and in parallel with said electromagnet means and with said contacts, said heating means being adjacent to said thermally responsive means, and means for varying the time required for said heating means to heat said thermally responsive means to close said contacts thereby to provide for varying liquid levels to be provided prior to operation of said drive means.

8. In a clothes washing machine, a rotatable clothes basket having a side wall and a bottom; means for washing clothes in said basket; an outer imperforate tub enclosing said basket side wall and bottom; a water inlet conduit extending to said basket; valve means for controlling the supply of liquid to said conduit; electromagnet means controlling said valve means, said electromagnet means when energized providing for liquid flow through said valve means and when de-energized preventing liquid flow through said valve means; means for controlling energization of said electromagnet means comprising normally open contacts in parallel with said electromagnet means, closing of said contacts causing de-energization of said electromagnet means by virtue of the resulting drop in voltage across said electromagnet means, thermally responsive means arranged to close said contacts upon sensing a predetermined amount of heat, means connected in parallel with said contacts for heating said thermally responsive means during energization of said electromagnet means, and means for varying the time required for said heating means to cause closing of said thermally responsive means whereby varying liquid levels can be provided in said basket; means forming substantial apertures in said basket bottom communicating with said tub; means including a pump for recirculating liquid from said tub into said basket, said pump having a greater capacity than said apertures whereby almost all the liquid is retained in said basket; electrical drive means operative upon de-energization of said electromagnet means for driving said clothes washing means; and second electric driving means for said pump connected in parallel with said first driving means and with said electromagnet means whereby said pump operates both during energization of said electromagnet means and of said drive means.

9. In a washing machine having an article and liquid receptacle: valve means for controlling the supply of liquid to said receptacle; electromagnet means for controlling said valve means; and means for controlling energization of said electromagnet means comprising contacts arranged in said circuit in controlling relation to said electromagnet means, said contacts having a first relationship in which said electromagnet means causes liquid to be supplied by said valve means and having a second relationship in which said electromagnet means prevents liquid from being supplied by said valve means, said contacts being normally arranged in said first relationship, thermally responsive means arranged to provide said second relationship of said contacts as the temperature of said thermally responsive means rises, electric heating means energizable when said contacts are in said first relationship and positioned to heat said thermally responsive means, and means for varying the time required for said heating means to cause said thermally responsive means to provide said second relationship of said contacts whereby varying liquid levels are provided in said receptacle.

10. The apparatus defined in claim 9 wherein said first relationship of said contacts causes energization of said electromagnet means and said second relationship of said contacts causes de-energization of said electromagnet means.

No references cited.